Figure 1:
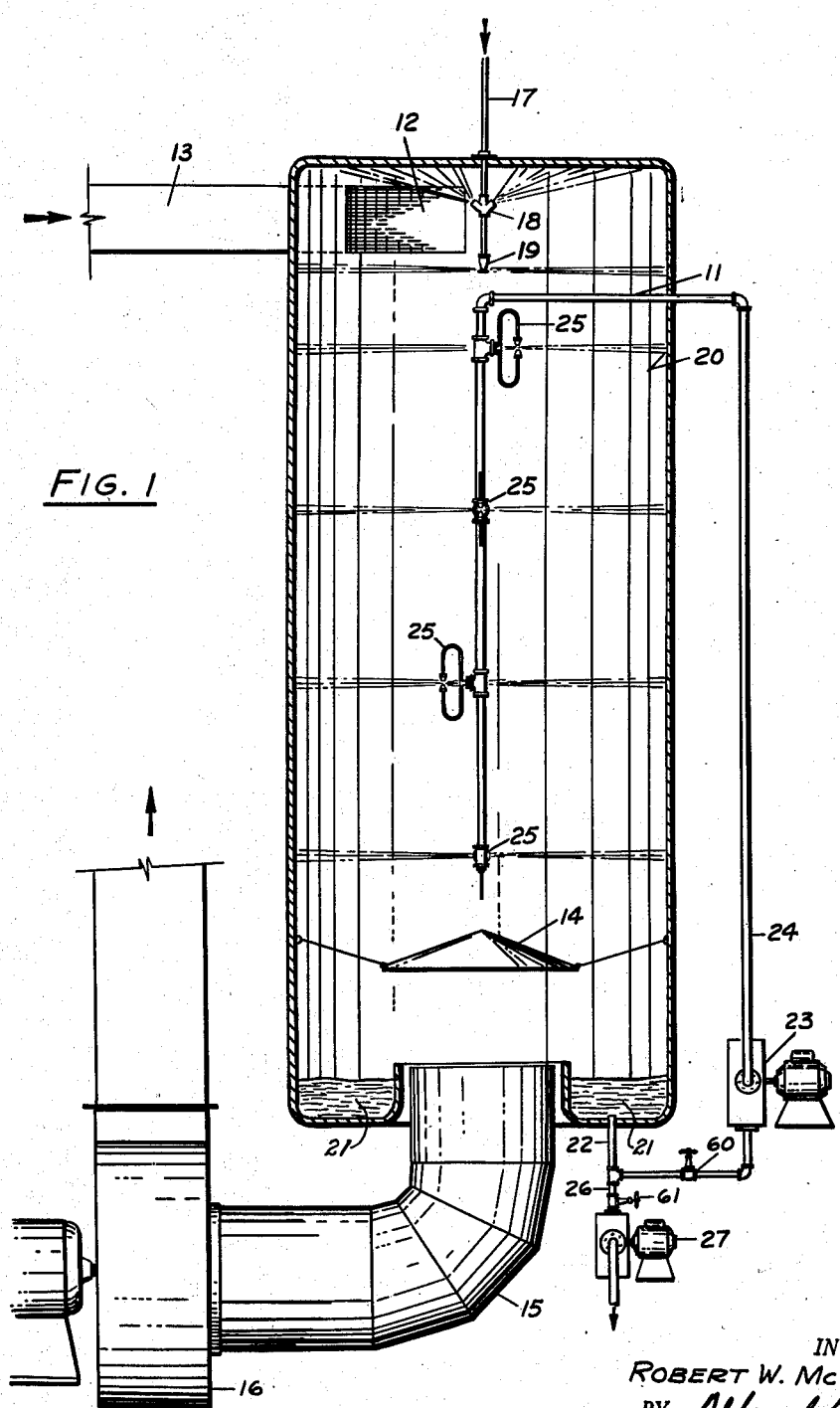

Nov. 11, 1952     R. W. McALLISTER     2,617,711
PROCESS OF MAKING CALCIUM CARBONATE
Filed April 30, 1949     2 SHEETS—SHEET 2

INVENTOR.
ROBERT W. McALLISTER
BY

Patented Nov. 11, 1952

2,617,711

UNITED STATES PATENT OFFICE 2,617,711

PROCESS OF MAKING CALCIUM CARBONATE

Robert W. McAllister, Carlisle, Mass.

Application April 30, 1949, Serial No. 90,570

11 Claims. (Cl. 23—66)

This invention relates to the manufacture of calcium carbonate by utilizing waste kiln gases from a limestone burning furnace.

In the manufacture of lime, limestone is burned to produce calcium oxide. During the process large quantities of carbon dioxide and fine particles of calcium oxide and limestone are normally vented to the air and lost.

Attempts have been made in the past to utilize these otherwise waste gases, but they have all been more or less unsuccessful. These attempts have been confined to bubbling the carbon dioxide containing gas after extensive purification through water containing suspended calcium hydroxide, but the process is slow and costly. No successful attempt has been made to use not only the carbon dioxide but also the entrained dust particles.

It is an object of this invention to produce relatively pure calcium carbonate from waste materials.

It is a further object to produce relatively pure calcium carbonate in a fine state of subdivision by utilizing waste materials from a lime kiln.

These and other objects which will become apparent may be accomplished by contacting lime kiln gases with finely dispersed water vapor and precipitating the resulting sludge as a first step and, as a second step, contacting the partially converted solids with the gas scrubbed by the first step. By these steps calcium oxide dust is reacted with water to form calcium hydroxide, and the calcium hydroxide is reacted with carbon dioxide present in the gas to form calcium carbonate.

In order to be economically useful the calcium carbonate finally produced should be finely divided, and free from alkalinity and color. All of these standards are easily attainable by following the process hereinbelow set forth.

Considered as a two-step process, the first step is concerned with scrubbing the entrained solid matter from stack gases and converting a predominant part of the calcium oxide there present to calcium carbonate. The second step is concerned with taking the sludge formed in the first step, the scrubbed carbon dioxide gas and completing the conversion so that a substantially alkaline-free, color-free, and finely-divided calcium carbonate material results.

In the usual limestone burning operation the flue gas contains all the carbon dioxide produced both from fuel combustion and from limestone calcination and from 1.0 to 5.0% of the calcium oxide formed from limestone calcination. Entrained with the calcium oxide dust are also fine particles of unburned limestone. The composition of the flue gases varies considerably but the gaseous components consist of 20 to 35% carbon dioxide (usually 25 to 30%), small amounts of oxygen in a range of 0.1 to 2.0%, and nitrogen. The entrained dust may range from 10% to 90% lime with the remainder being limestone, although normally 60 to 80% of the dust is lime. The common dust loading varies from 2 to 12 grains per thousand cubic feet of flue gas.

The particles of lime and limestone are extremely finely divided and may not be largely removed by ordinary means. The high temperature of the kiln gas (to 1200° F.) also makes removal impractical by known means. It has been found that rather efficient removal may be obtained by causing the flue gases to move at high velocities in a cyclonic motion in a scrubber and contacting the gases with atomized water. The fine particles of water entrain the particles of dust, and react with the oxide to form calcium hydroxide which in turn reacts in the finely divided state with the carbon dioxide content of the gas. Because of the nature of gas motion, the water suspension impinges against the sides of the scrubber, and runs down the sides. Further reaction with calcium hydroxide takes place as the carbon dioxide containing gases contact the thin layer of fluid. If desired, the percentage reacted in the first step may be increased by recycling a portion of the sludge formed.

The sludge or slurry which may contain from 2 to 8% solids of which about 90% may be calcium carbonate is converted to 100% calcium carbonate in the second step. This step comprises spraying the sludge into a second reactor and contacting it with scrubbed gas emerging from the first reactor. With a suitably tall scrubbing tower the second or finishing step may be carried out in the primary scrubber.

Variable factors influencing the rate of reaction of calcium hydroxide with carbon dioxide include the temperature, the surface area of the calcium hydroxide exposed and the time of contact. The temperature is normally maintained high as the stack gases enter at a temperature of about 1000° F. and the slurry at the end of the reaction in the first step has a temperature of about 180° F. To secure the maximum surface area of exposed calcium hydroxide, the water and/or slurry is introduced in a very finely divided form. The particles are then thrown against the side of the reactor to form thin films of fluid which then are exposed to the kiln gases for a sufficient length of time by constructing the reactor of appropriate length and inserting any desirable baffles. Further surface may be exposed by recycling. In order to increase the exposed surface of calcium hydroxide still further the slurry containing both lime and calcium carbonate may be pumped by means of a gear pump. The shearing action of the gears acts somewhat as a spatula and opens agglomerates whose outer surface is calcium carbonate and whose inner portions are as yet unreacted lime. Preferably the recycling is carried out continuously with continuous removal of slurry.

The slurry as it is removed from the first reactor is then pumped, preferably by a gear pump, to a second reactor where it is sprayed into an atmosphere of scrubbed gases taken from the first reactor. Pure calcium carbonate may be continuously withdrawn, filtered, and if desired, dried.

The product itself is unusual in that although it contains considerable amounts of unburned limestone, it nevertheless has the physical appearance of fine precipitated calcium carbonate. Examination of the product shows that the unburned limestone and precipitated calcium carbonate are so intimately mixed that the characteristic grey color of limestone is covered up and is not detectible by examination. It is believed that at least some of the limestone dust particles are burned on the outside and in the process of hydrating the dust and reacting the hydrated lime with carbon dioxide, the outside portion of such particles are converted to precipitated calcium carbonate. Other limestone particles which have escaped burning come in contact with dissolved calcium hydroxide and the surface is coated therewith. Again the hydroxide is converted to the carbonate thus coating the surface. But by whatever means, or by whatever mechanism the mixing or coating takes place, the product shows no evidence of grey limestone.

The carbonate slurry resulting from the final step is preferably centrifuged to separate agglomerated particles or other extraneous material from the more finely divided material.

For some applications the total carbonated product is useful. For other applications I find it desirable to separate all particles substantially below five microns by centrifugal means.

In order to understand my invention more clearly reference may be had to the accompanying drawings.

Figure 2:
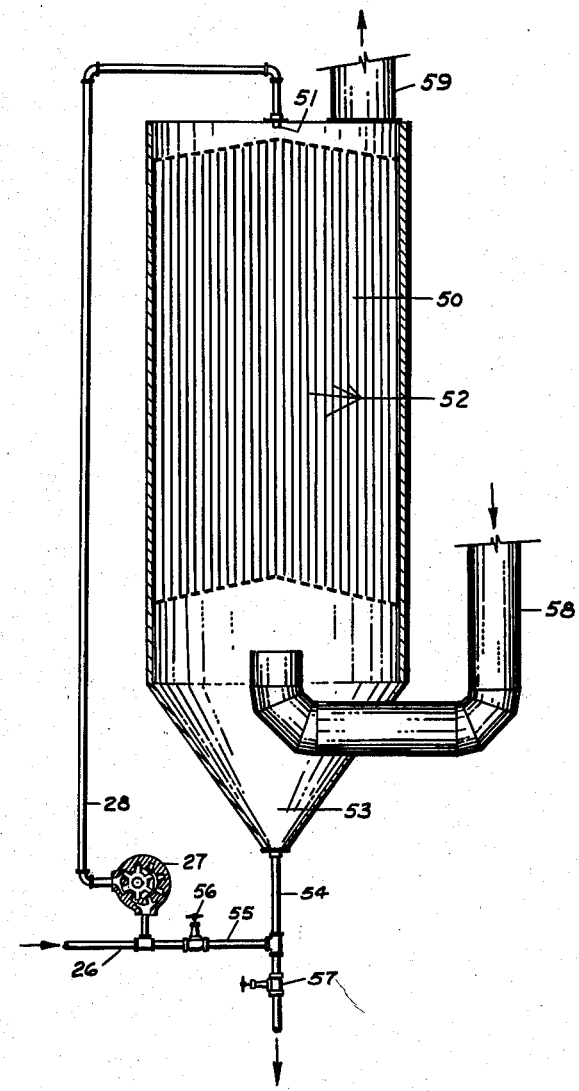

Fig. 1 is a front elevation, partly in section, of a reaction chamber suitable for carrying out the first step of the process and Fig. 2 is a front elevation, partly in section, of a reaction chamber suitable for carrying out the second step.

Referring to Fig. 1, the flue gases are introduced into cylindrical reactor 11 through opening 12 in conduit 13 at a high velocity by fan means not shown. The angle of conduit 13 is such that the gases enter tangentially to the walls and thus revolve at a high rate of speed, finally passing plate 14, and leaving by means of conduit 15 whence they are expelled by the action of fan 16. Water is introduced under considerable pressure into reactor 11 by means of pipe 17, and is sprayed through nozzles 18 against the roof of the reactor. Some of the water is sprayed through nozzle 19 directly into the gas stream. Nozzle 19 is designed to form very minute droplets capable of removing the fine dust particles. The wetted particles are thrown against wall 20 of reactor 11, and run down the sides to collect as a slurry in receiving basin 21. From basin 21 the slurry is removed by pipe means 22 by adjusting valves 60 and 61 and a portion is recycled through pump 23 and pipe means 24 back into reactor 11. Pipe means 24 is provided with opposed nozzles 25 which spray the slurry into the gas and against wall 20. Again the slurry runs down wall 20 and into basin 21, whence it is removed by pipe means 22 and 26 controlled by valves 60 and 61 through pump 27.

Referring to Fig. 2 the slurry leaving reactor 11 through pipe means 26 is pumped by means of pump 27 into reactor 50 through pipe means 28. It is sprayed into reactor 50 through nozzle 51 and filters through ceramic packing 52 to collecting chamber 53. The slurry may be recycled if desired by closing valve 57, and opening valve 56 in line 55 or it may be drawn off by closing valve 56 and opening valve 57. The scrubbed gases carried by fan 16 shown in Fig. 1 enter reactor 50 by means of conduit 58. The gas flows counter-current to the slurry and is removed through conduit 59.

Various modifications of my process are possible but in each of them it is required that the flue gases enter the reactor and contact a fine water dispersion. In the device as described above, some water is sprayed against the roof of the reactor. This prevents caking of the dust on the roof but is not essential to the practice of the invention. The preferred method also includes the use of cyclonically moving stack gases, as this accomplishes the removal of the fine air dispersion of water and entrained dust by causing a coalescing of the droplets as they are thrown against the side of the reacting vessel. Other means may, of course, be employed to "precipitate" the fine water particles such as mechanical or electrostatic collectors.

The finishing step may also be carried out in other ways then as shown such as by spray drying the slurry into an atmosphere of scrubbed flue gas. Another way to complete the carbonation is by construction of a suitably high scrubbing tower with or without baffles and recycling pumps, whereby the second step may be carried out in the bottom of the original scrubber. In such case the scrubbed kiln gas is used for this final conversion. We have also found it desirable at times to introduce fresh quicklime, hydrated lime or limestone into the flue gas passing from the lime kiln to the scrubber in order to produce additional quantities of precipitated calcium carbonate product. This method offers a convenient method of using a higher percentage of the excess carbon dioxide passing up the kiln stack. In any case it is essential that the finishing step takes place by dispersing the slurry in the presence of washed gases.

Having now described my process, I claim:

1. A process for producing calcium carbonate which comprises the steps of conducting lime kiln exhaust gases containing lime dust, limestone dust and carbon dioxide to a reaction zone, introducing fine particles of water in a co-current flow into said reaction zone simultaneously with said lime kiln exhaust gases, contacting said lime kiln exhaust gases with said fine particles of water, reacting immediately substantially all said lime dust with said water to form a fine suspension of calcium hydroxide which then immediately reacts with the carbon dioxide present in said gases to form fine particles of calcium carbonate, removing the solid reaction products from said reaction zone by coalescing and collecting said fine suspension of calcium carbonate by causing said gaseous medium to move in cyclonic fashion.

2. The process in accordance with claim 1 wherein the lime kiln gases are fortified with added amounts of calcium hydroxide.

3. The process in accordance with claim 1 wherein the lime kiln gases are fortified with added amounts of lime kiln products.

4. A process for producing calcium carbonate which comprises the steps of conducting lime kiln exhaust gases containing lime dust, limestone dust, and carbon dioxide to a reaction zone, introducing fine particles of water in a co-current flow into said reaction zone simultaneously with said lime kiln exhaust gases, contacting said lime kiln exhaust gases with said fine particles of water, reacting immediately substantially all said lime dust with said water to form a fine suspension of calcium hydroxide, which then immediately reacts with the carbon dioxide present in said gases to form fine particles of calcium carbonate, removing the solid reaction products from said reaction zone by coalescing and collecting said fine suspension of calcium carbonate and unreacted calcium hydroxide, to form a slurry and recycling a portion of said slurry by introducing said portion in a finely divided state with said gases and said water into said reaction zone.

5. The process in accordance with claim 4 wherein the solid reaction products are coalesced and collected by causing the gaseous medium to move in cyclonic fashion.

6. The process in accordance with claim 5 wherein the lime kiln gases are fortified with added amounts of calcium hydroxide.

7. The process in accordance with claim 5 wherein the lime kiln gases are fortified with added amounts of lime kiln products.

8. A process for producing calcium carbonate which comprises the steps of conducting lime kiln exhaust gases containing lime dust, limestone dust, and carbon dioxide to a first reaction zone, introducing fine particles of water in a co-current flow into said reaction zone simultaneously with said lime kiln exhaust gases, contacting said lime kiln exhaust gases with said fine particles of water, reacting immediately substantially all said lime dust with said water to form a fine suspension of calcium hydroxide which then immediately reacts with the carbon dioxide present in said gases to form fine particles of calcium carbonate, removing the solid reaction products from said reaction zone by coalescing and collecting said fine suspension of calcium carbonate and unreacted calcium hydroxide to form a slurry, conducting the resulting exhausted lime kiln exhaust gases into a second reacting zone, and spraying slurry collected from the first reacting zone into said exhaust gases in said second zone, and removing substantially pure calcium carbonate.

9. The process in accordance with claim 8 wherein the solid reaction products are coalesced and collected in the first reaction zone by causing the gaseous medium to move in cyclonic fashion.

10. The process in accordance with claim 8 wherein the lime kiln gases are fortified with added amounts of calcium hydroxide.

11. The process in accordance with claim 8 wherein the lime kiln gases are fortified with added amounts of lime kiln products.

ROBERT W. McALLISTER.

REFERENCES CITED

The following references are of record in the file of this patent:

UNITED STATES PATENTS

| Number | Name | Date |
|---|---|---|
| 651,684 | Westman | June 12, 1900 |
| 845,190 | Osborne | Feb. 26, 1907 |
| 1,121,532 | Newberry | Dec. 15, 1914 |
| 1,169,764 | Brassert | Feb. 1, 1916 |
| 1,188,505 | Statham | June 27, 1916 |
| 1,847,179 | Genter | Mar. 1, 1932 |
| 1,872,891 | Church | Aug. 23, 1932 |
| 1,954,211 | Kuntz | Apr. 10, 1934 |
| 2,020,098 | Bird | Nov. 5, 1935 |
| 2,036,517 | Colman | Apr. 7, 1936 |
| 2,334,621 | Goodell | Nov. 16, 1943 |